Patented Feb. 13, 1940

2,189,778

UNITED STATES PATENT OFFICE 2,189,778

PROCESS FOR THE PRODUCTION OF ASCORBIC ACID FROM SORBOSE

Otto Dalmer and Kurt Heyns, Darmstadt, Germany, assignors to Merck & Co. Inc., Rahway, N. J., a corporation of New Jersey No Drawing. Application July 15, 1937, Serial No. 153,761. In Germany July 18, 1936

8 Claims. (Cl. 260—344)

This invention relates to the production of ascorbic acid from sorbose.

In our auuplication Serial No. 153,760, filed July 15, 1937, it has been shown that keto-gulonic acid can be obtained by direct oxidation of sorbose in the presence of a noble metal catalyst. It has also been shown in that application how the crystalline keto-gulonic acid may be isolated from the reaction mixtures obtained in this way. However, we have found that it is not at all necessary in all circumstances to isolate the keto-gulonic acid for the further production of ascorbic acid. It may be possible, to directly treat the resulting mother liquor after first reducing the volume as much as possible, with concentrated hydrochloric acid. The concentrated hydrochloric acid, in contradistinction to weak acids, serves a dual purpose. First of all, under carefully controlled conditions it will convert the keto-gulonic acid or its salt, as it is originally contained in the alkaline reaction mixture into free ascorbic acid, while at the same time the small amounts of sugar that are still present in the mother liquor are carbonized so that they will no longer interfere with the crystallization of the formed ascorbic acid. Before treating the reaction mixture obtained by direct oxidation of sorbose with hydrochloric acid, the major part of the unchanged sorbose can be removed by crystallization and filtration.

In the conversion of keto-gluonic acid into ascorbic acid, it is advantageous not only to use concentrated hydrochloric acid at the start, but also to maintain that concentration by working in a closed vessel (under pressure) or to replace hydrochloric acid lost by evaporation, by constant or intermittent addition of hydrochloric acid. The time necessary to attain maximum yield varies with the temperature. Whereas 5 days, for example, may be necessary at room temperature, only one hour may be necessary at 60° C. to 70° C. Above 80° C. the reaction proceeds too rapidly. The practical limits are therefore above room temperature and not substantially above 80° C.

At any given temperature, it has been found that the formation of ascorbic acid first rises to a maximum and then falls off again. Therefore, the critical point is ascertained by removing samples of the reaction mixture at intervals, determining the ascorbic acid therein by analysis (e. g. by titration with $n/10$ iodine solution) and discontinuing the reaction at the optimum point.

An excess of hydrochloric acid is recommended, e. g. 5 to 10 times as much hydrochloric acid as keto-gulonic acid, by weight.

In isolating ascorbic acid, animal charcoal can be employed to remove dark colored products. The excess of hydrochloric acid has to be removed by evaporation, care being taken to work at low temperatures, using reduced pressure to prevent decomposition.

In the following example we are describing the formation of ascorbic acid from sorbose via the catalytic oxidation method followed by directly treating the resulting reaction mixture with hydrochloric acid.

Example 180 g. of sorbose and 100 g. of sodium carbonate, dissolved in about 9 liters of water, are oxidized in the presence of 100 g. of platinized carbon by shaking the solution with oxygen until no further absorption takes place. After filtering off the catalyst, the solution is concentrated under reduced pressure to 1 liter of total volume and then saturated with a rapid stream of hydrogen chloride under efficient cooling with ice. The solution is filtered off through a glass filter plate from the precipitated salt. The mother liquor is then heated for 1½ hours to about 70° after cooling to 0° by adding ice, decolorized with carbon and filtering, the solvent is evaporated under reduced pressure. The resulting mixture of crystals and dark colored syrup is stirred up with methanol for the separation of salts. The solution freed from the salt crystals by filtration is, after another treatment with carbon, evaporated to a thick syrup under reduced pressure, whereby the temperature of the water bath should not exceed 40°. After standing for several days, the content of the flask has solidified and is permeated with ascorbic acid crystals. The total residue is mixed with some acetone and filtered. The yield of ascorbic acid is 34 g.

We claim as our invention:

1. The process which comprises reacting an aqueous solution of sorbose with oxygen in the presence of a noble metal catalyst, maintaining the hydrogen ion concentration conditions of that solution at approximate values represented by a pH of the order of about 6 to 11 treating the oxidized solution with concentrated hydrochloric acid, and separating ascorbic acid.

2. The process which comprises reacting sorbose with oxygen in the presence of a noble metal catalyst treating the oxidized solution with concentrated hydrochloric acid at a temperature between room temperature and 80° C., and separating ascorbic acid.

3. The process which comprises reacting an aqueous solution of sorbose with oxygen in the presence of a noble metal catalyst, maintaining the hydrogen ion concentration of said solution at values of the order of about 6 to 11 treating the oxidation mixture with concentrated hydrochloric acid at a temperature between room temperature and 80° C., to convert oxidized sorbose to ascorbic acid and unchanged sorbose to dark-colored products, and separating the ascorbic acid from said dark-colored products.

4. As an intermediate for the production of ascorbic acid, the reaction mixture obtained by the catalytic oxidation of sorbose in moderately alkaline aqueous solution, having a pH range of the order of about 8 to 11.

5. The process comprising reacting an aqueous solution of l-sorbose with oxygen, in the presence of a noble metal catalyst, maintaining the hydrogen ion concentration of said solution at values of the order of about 6 to 11, treating the oxidation mixture with concentrated hydrochloric acid to convert oxidized sorbose to ascorbic acid and unchanged sorbose to dark-colored products, and separating the ascorbic acid from said dark-colored products.

6. The process comprising reacting an aqueous solution of l-sorbose with oxygen in the presence of platinized carbon, said solution being between weakly alkaline and substantially neutral, treating the oxidation mixture with concentrated hydrochloric acid to convert oxidized sorbose to ascorbic acid and unchanged sorbose to dark-colored products, and separating the ascorbic acid from said dark-colored products.

7. The process comprising reacting an aqueous solution of sorbose with oxygen in the presence of a noble metal catalyst, while maintaining the pH of said solution between 8 and 10, treating the oxidized solution with concentrated hydrochloric acid, and separating ascorbic acid.

8. The process comprising reacting an aqueous solution of sorbose with oxygen in the presence of a noble metal catalyst, while maintaining the pH of said solution between 8 and 10, treating the oxidized solution with concentrated hydrochloric acid at a temperature between room temperature and 80° C., and separating ascorbic acid.

OTTO DALMER.
KURT HEYNS.